B. HOLT.
TRACTION ENGINE.
APPLICATION FILED JUNE 13, 1910.
1,026,091.
Patented May 14, 1912.
2 SHEETS—SHEET 1.
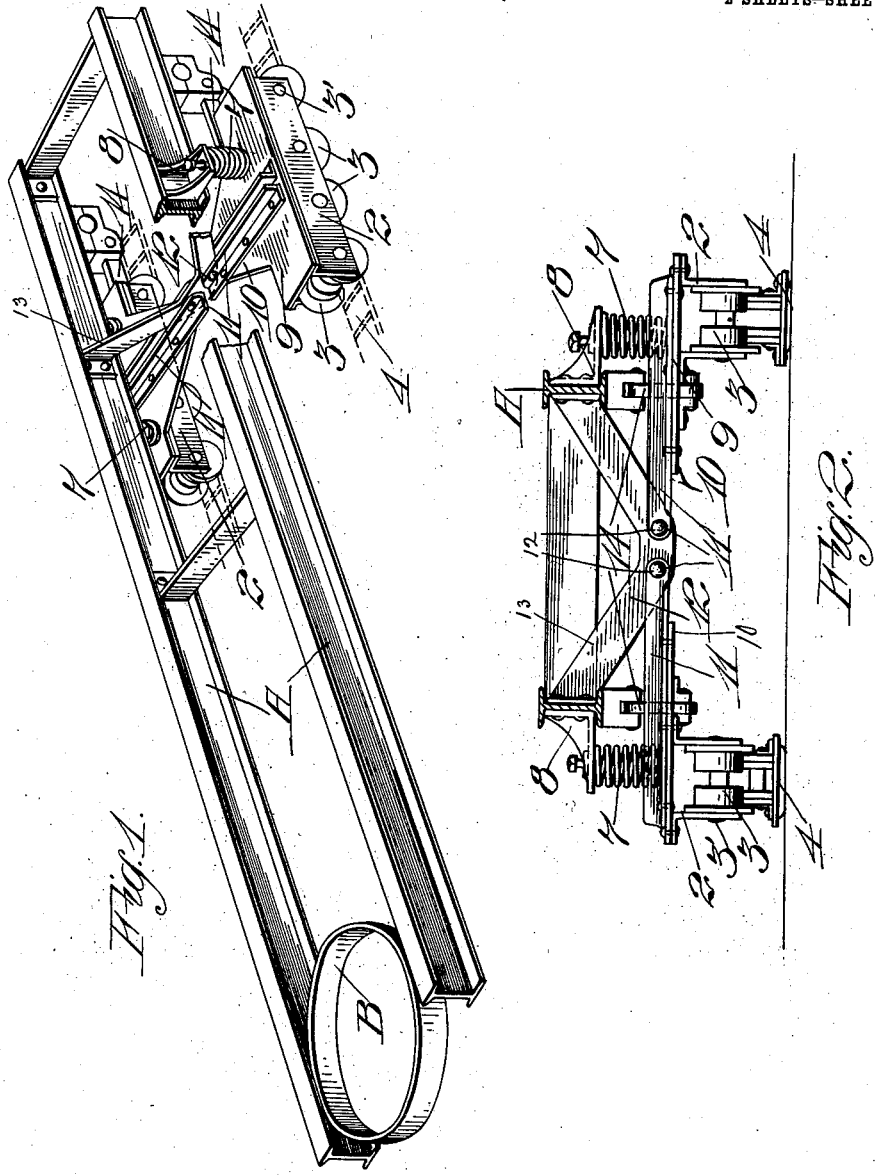

B. HOLT.
TRACTION ENGINE.
APPLICATION FILED JUNE 13, 1910.
1,026,091.
Patented May 14, 1912.
2 SHEETS—SHEET 2.
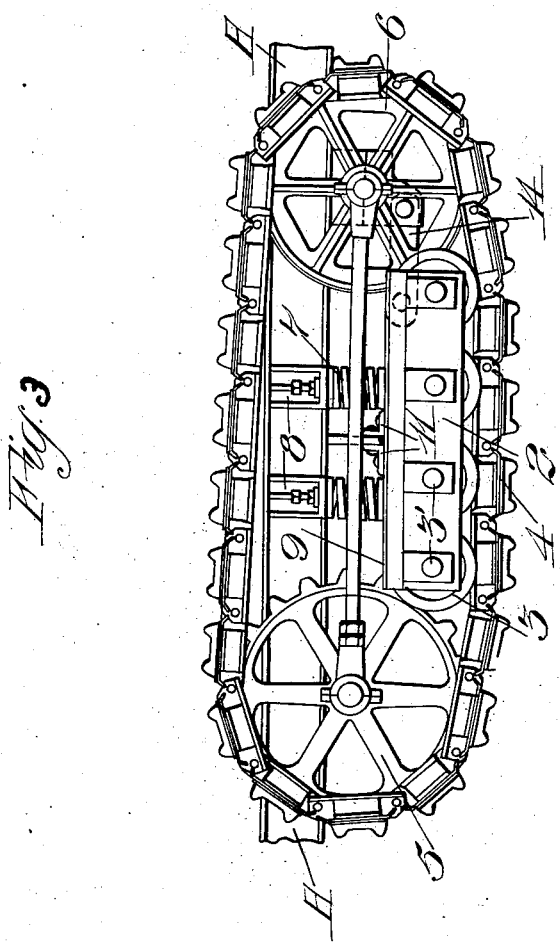
Witnesses
Thos Castberg
F. E. Maynard
Inventor
Benjamin Holt
by
G. H. Strong
his Atty.

UNITED STATES PATENT OFFICE.

BENJAMIN HOLT, OF STOCKTON, CALIFORNIA.

TRACTION-ENGINE.

1,026,091.   Specification of Letters Patent.   Patented May 14, 1912.

Application filed June 13, 1910. Serial No. 566,634.

*To all whom it may concern:*

Be it known that I, BENJAMIN HOLT, citizen of the United States, residing at Stockton, in the county of San Joaquin and State of California, have invented new and useful Improvements in Traction-Engines, of which the following is a specification.

This invention relates to wheel trucks, and particularly to trucks for traction engines adapted to be propelled in conjunction with flexible endless platforms.

My invention is designed with the purpose of providing an effective, resilient truck structure, particularly applicable to the frame of traction engines of the type which are supported on and propelled by one or more flexible, endless, self-laying belt-tracks or traveling platforms, an object being to so connect the trucks yieldingly to the frame that a practically universal joint is obtained between each truck and the frame, thus measurably reducing the great stresses presented by a stiff, non-yielding truck, and saving the gear from excessive wear; each truck being entirely free from and independent of the other.

The invention consists of the parts and the construction and combination of parts as hereinafter more fully described and claimed, having reference to the accompanying drawings, in which—

Figure 1 is a perspective view of the frame and truck, partly in section. Fig. 2 is a transverse section of the frame, showing the trucks in end elevation. Fig. 3 is a side elevation of the frame, truck and track.

It is a desideratum to obtain a truck structure for traction engines which operate in combination with flexible, endless tracks, which will most successfully bear the engine frame and prevent the transmission of vibration and strain to the engine as the device travels over the ground, and which at the same time will afford the most effective, economical and practical operative support to the traction belt platform, or "self-laying track," as it is commonly designated.

Practical experience proves that a most efficient combination comprises the organization herewith illustrated, in which a suitable frame A is embodied, provision being made at B for appropriate steering connections.

Adjacent to one end of the frame A and parallel to its sides are trucks 2 having flanged rollers 3 arranged in pairs adapted to support the back of the ground run of suitable endless, linked tracks or belts 4. Each truck is in the farm substantially of an inverted channel made of heavy steel plates riveted together; the rollers 3 being journaled on pins 3′ which extend through the sides of the trucks, and each pair of wheels 3 having flanges which act as guides for the inner faces of the links of the track belts 4.

Each belt 4 is carried and propelled by a suitable sprocket 5 and pulley-wheel 6 mounted on the frame and independent of its truck, and in the plane thereof, although in some cases the front idle wheel 6 may be carried on the truck frame. The wheels 5—6° project between the rollers 3 of the truck, but out of interference therewith, and serve to hold the truck in parallelism with the frame.

Power to drive the sprockets 5 and belts may be derived from an engine (not shown) of appropriate style suitably mounted on the frame.

In order to yieldingly support the frame so that the trucks may rock in a vertical plane conformable with the irregularities in the surface of the roadway, without imparting the vibrations to the frame, suitable springs 7 are interposed between the trucks and the brackets 8 secured on frame A. These springs are only designed and adapted to support the load on the trucks, and to absorb the greater percentage of shocks incident to the travel of the belts over the ground.

Each truck is arranged outside of the main frame and is located within the endless traction members or belts 4, and the entire load is supported on the springs 7 and trucks; the trucks being free to oscillate in vertical planes independent both of the frame and of the sprockets 5 and guide pulleys 6. Owing to the heavy weight, amounting sometimes to several tons, which these trucks must support, and by reason of the length and shape of the trucks, the tendency of each truck to tip over and skid and to veer from the line of draft, is manifestly very great; and it is, therefore, toward the end of maintaining these trucks upright and parallel with the frame, that the present invention is particularly directed. As these trucks are arranged at one side of, and usually outside of the frame, as here shown, the problem of proper support for the trucks, without interfering with their capacity to undulate, is found to be a serious problem in the actual construction of these machines. The method here shown, and about to be described, is one effective method of accomplishing the desired result.

As here shown, the top plate 9 of each truck has an inwardly extending, horizontal, triangular projection 10 forming a reinforcing bracket or brace for the angle-bars 11 which are bolted crosswise of the truck to the plate 9 and its extension 10; there being a pair of these angle-bars 11 for each truck, constituting a radius arm and support for the truck, and the inner end of the arm having a loose, swiveling, pivotal connection, at 12, on some suitable portion of the engine frame, as, for instance, the drop hanger and cross-brace 13. Each truck is thus pivoted direct to the frame by an offset lateral connection, and the pivot 12 is loose enough to allow for a truck to rock independently in a plane parallel with the length of the frame. The arms 11 are rigidly connected to each truck and extend inwardly and pivot in the manner described and effectually operate to prevent the trucks from tipping over. The rigid connection of the arms 11 with the trucks is essential, as otherwise the ground run of the traction member 4 and the bottom of the truck would skid or get out of vertical alinement.

Since the weight of the vehicle is supported entirely on the trucks, and as these machines are often very heavy, and the weight may or may not be carried over the center of the trucks, the tendency of the trucks to turn sidewise or to skid from under the machine is very great, as previously stated. The flanges on the wheels 3 keep the ground run of the traction member always in the plane of the trucks, while the rigid arms 11 with their pivotal connections 12 maintain the trucks always vertical and yet allow for the necessary undulating movement. The tendency of the trucks to tip sidewise and the belt to skid is particularly great in turning corners, by reason of the long frictional bearing surface that the tread member has on the ground.

In order to prevent longitudinal movement of the trucks independent of the frame, and relieve the springs of lateral strain or twist, I employ the links or pivot bars 14; the backward thrust of the trucks, due to the travel of the traction member, being resisted by these pivot bars. At the same time, these pivot bars permit of the desired undulating action of the truck and ground run of the traction belt.

The loose intermeshing of the wheels 5—6 with the ends of each truck and with the front and rear sets of rollers 3 will serve to keep the trucks parallel with the frame.

The construction here described of so connecting the trucks to and supporting them from the frame, that each may yield practically independently of the other and of the frame, is important, especially in traveling over rough roads or land, where each track belt encounters irregularities different from the other, and where the trucks are constantly rocking and assuming opposite or different angles.

Having thus described my invention, what I claim and desire to secure by Letters Patent is—

1. The combination with a main frame, of flexible, endless traction members, trucks located within said members, springs between the trucks and frame and yieldingly supporting the latter, and means for maintaining said trucks upright, said means including a transversely extending arm on each truck and rigidly secured thereto, with the free ends of said arms pivotally supported on the frame, so that each truck is free to rock and move in a vertical plane.

2. The combination of a main frame and flexible endless traction belts, trucks outside of and having means for yieldingly supporting the frame and around which the traction belts travel, transverse connections between the central part of the frame and each truck, said transverse connections having a pivotal connection with the frame and a rigid connection with its truck to permit the trucks to tilt independently of each other.

3. The combination of an engine frame, a flexible, endless track, a truck bearing upon the ground run of said track and resiliently supporting the frame, and means for maintaining said truck upright, said means including an inwardly extending plate on the truck and rigidly connected thereto, and said plate having its inner end pivotally connected to the frame.

4. In a traction engine, a main frame, endless, flexible tracks, wheels on the frame carrying and driving said tracks, trucks outside the frame and swivelly connected by transverse rigid brackets to said frame, and rollers on the trucks resting on the ground run of the tracks, said rollers and wheels on the frame being interlapped.

5. The combination with a main frame, of parallel, endless, flexible tracks, trucks disposed within said tracks, rollers journaled in said trucks and supported on the ground run of said tracks, and wheels supported on the main frame and around which the flexible tracks travel, and certain of said wheels interlapping the rollers, whereby the trucks are prevented from twisting sidewise.

6. The combination with a main frame, of traveling, endless, flexible tracks, driving wheels therefor on the frame, trucks within the tracks, and at the sides of the frame and having means for yieldingly supporting the frame, so that the trucks may rock in vertical plane, and connections between said trucks and frame, including angle-bars rigidly secured to the trucks and projecting laterally toward and pivoted to the frame.

In testimony whereof I have hereunto set my hand in the presence of two subscribing witnesses.

BENJAMIN HOLT.

Witnesses:
P. S. SPRINGER,
H. E. THRELFALL.